UNITED STATES PATENT OFFICE.

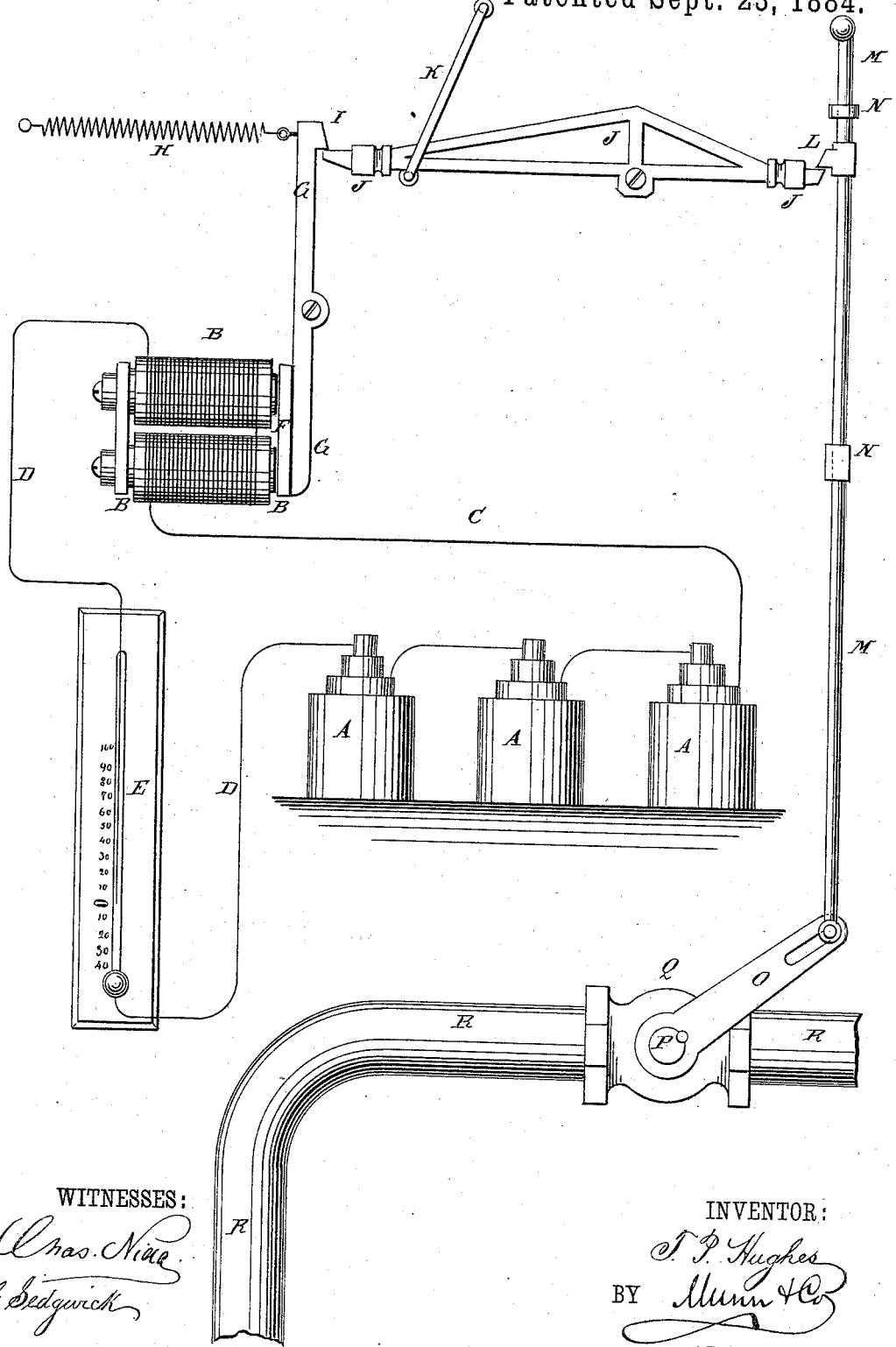

THOMAS PYKE HUGHES, OF DENVER, COLORADO.

AUTOMATIC ELECTRIC SHUT-OFF FOR WATER AND GAS PIPES.

SPECIFICATION forming part of Letters Patent No. 305,595, dated September 23, 1884.

Application filed January 9, 1884. (No model.)

*To all whom it may concern:*

Be it known that I, THOMAS PYKE HUGHES, of Denver, in the county of Arapahoe and State of Colorado, have invented a new and useful Improvement in Automatic Electric Shut-Offs for Water and Gas Pipes, of which the following is a full, clear, and exact description.

Reference is to be had to the accompanying drawing, forming part of this specification, and which is a view illustrating my improvement.

The object of this invention is to prevent the freezing of water and gas pipes.
The invention consists in an automatic shut-off for water and gas pipes, constructed with a spring-held lever, a connecting-lever, and a drop-rod interposed between a stop-cock in the said pipe and the armature of a magnet having an electric thermometer placed in its battery-circuit, whereby a fall of temperature below a fixed point will break the electric circuit and release the said rod, allowing it to close the said stop-cock and shut off the water or gas, as will be hereinafter fully described and claimed.

A represents a battery, the poles of which are connected with the helix of a magnet, B, by the wires C D. The wire D is made in two parts, one of which is connected with the mercury in the bulb of a thermometer, E, and the other passes in through the upper end of the stem of the said thermometer, and extends down through the said stem to the freezing-point or any other desired point of the said stem. With this construction the electric circuit will remain closed until the temperature becomes so cold as to cause the mercury in the thermometer to sink below the point to which the end of the wire extends, when the circuit will be broken. The armature F of the magnet B is attached to the lower arm of a lever, G, pivoted at its middle part to the wall of the building or some other suitable support.
To the upper end of the lever G, upon the same side as the armature F, is attached the end of a spiral or other spring, H, the other end of which is attached to the wall of a building or other suitable support, and which is made of such a strength that it will move the lever G to withdraw the armature F from the magnet B when the electric circuit is broken, but cannot move the said lever against the attractive power of the magnet when the circuit is closed.
Upon the upper end of the lever G, at the side opposite the spring H, is formed a shoulder, I, to serve as a catch to engage with and hold the end of the lever J when the electric circuit is closed, and hold the armature F in place against the poles of the magnet B, but which will be withdrawn from the end of the said lever J when the armature F is withdrawn from the said poles of the magnet B. The lever J is fulcrumed to the wall of the building or some other suitable support, and is kept in the same vertical plane by a keeper, K, through which one of its arms passes. When one end of the lever J is engaged with the shoulder I of the lever G, the other end of the said lever J is engaged with a shoulder or projection, L, formed upon or attached to the vertical rod M, which slides in bearings N, attached to the wall of the building or other suitable support. The lower end of the rod M is pivoted to the slotted outer end of the crank-arm O, attached to the plug P of the stop-cock Q, placed in the water or gas pipe R, and the said rod M is made sufficiently heavy to turn the plug P and close the stop-cock Q by its own weight when released from the lever J.

The stop-cock Q is designed to be so formed that when closed to prevent any more water from entering the upper part of the pipe R it will open a discharge-passage to allow the water in the upper part of the said pipe to flow out, and thus prevent the said water from being frozen, the said stop-cock being placed below the part of the said pipe liable to be frozen. With this construction the water or gas will be shut off automatically as soon as such a temperature has been reached as will be liable to freeze the contents of the supply-pipe.
I am aware that it is old in fire-extinguishing apparatus to arrange the battery, circuit-wires, magnet, thermometer, and armature in substantially the manner herein shown and described; also, that it is old to release a weighted rod connected to a stop-cock at its lowest end by means of a sliding globe, which globe was in turn released from a hooked lever or armature by an electro-magnet operating in the usual manner; also, that a throttle-valve of an engine has been operated by a weighted cord passing over a drum provided with ratchet-teeth and a pawl for engaging said teeth, the said pawl being thrown out of engagement by a weighted lever connected to a hooked lever, which latter lever was caused to release the former lever by the action of an electro-magnet, and I do not desire to claim any such construction as of my invention, broadly.

Having thus described my invention, I claim as new and desire to secure by Letters Patent—

In an automatic electric cut-off for pipes, the combination of the battery A, magnet B, thermometer E, circuit-wires C and D, connected to the battery, magnet, and thermometer, as described, with pivoted spring armature-lever F G, hooked at its upper end, vertical rod M, sliding in suitable brackets, shoulder L at the upper end of said rod, horizontal lever J, one arm of which engages the hooked armature-lever and the other the shoulder L, stop-cock P Q, and arm O, connected therewith and to the lower end of the rod M, whereby when the contents of the thermometer fall below a determined point the circuit will be closed, the armature-lever released, and the rod M allowed to fall and close the stop-cock, substantially as shown and described.

THOMAS PYKE HUGHES.

Witnesses:
W. A. MAREAN,
J. C. STARKWEATHER.